United States Patent
Mayer et al.

(10) Patent No.: US 8,868,982 B2
(45) Date of Patent: Oct. 21, 2014

(54) COMPACT FUNCTION TRACE BASED ON EXECUTION LENGTH OF LEAF FUNCTIONS

(75) Inventors: Albrecht Mayer, Deisenhofen (DE); Harry Siebert, Puchheim (DE)

(73) Assignee: Infineon Technologies AG, Neubiberg (DE)

( * ) Notice: Subject to any disclaimer, the term of this patent is extended or adjusted under 35 U.S.C. 154(b) by 357 days.

(21) Appl. No.: 13/352,431

(22) Filed: Jan. 18, 2012

(65) Prior Publication Data
US 2013/0185601 A1    Jul. 18, 2013

(51) Int. Cl.
    *G06F 11/00*    (2006.01)
(52) U.S. Cl.
    USPC ............................................. 714/45; 717/128
(58) Field of Classification Search
    None
    See application file for complete search history.

(56) References Cited

U.S. PATENT DOCUMENTS

| | | | |
|---|---|---|---|
| 5,732,272 A * | 3/1998 | Gochee | 717/128 |
| 6,918,065 B1 * | 7/2005 | Edwards et al. | 714/45 |
| 7,793,160 B1 * | 9/2010 | McClure et al. | 714/45 |
| 2005/0283765 A1 * | 12/2005 | Warren et al. | 717/131 |
| 2008/0016407 A1 * | 1/2008 | Abernathy et al. | 714/45 |
| 2010/0281308 A1 * | 11/2010 | Xu et al. | 714/45 |
| 2012/0095728 A1 * | 4/2012 | Ubukata | 702/186 |
| 2012/0311307 A1 * | 12/2012 | Chynoweth et al. | 712/234 |

* cited by examiner

*Primary Examiner* — Gabriel Chu
(74) *Attorney, Agent, or Firm* — Eschweiler & Associates, LLC

(57) ABSTRACT

In accordance with one aspect of the invention, a system for generating compact function trace data for leaf functions includes a central processing unit (CPU), configured to output program flow information needed for generating a program flow trace, and a trace unit, coupled to the CPU. The trace unit is configured to receive the program flow information from the CPU for generating compact function trace data. The trace unit further comprises a first output mode and a second output mode and is further configured to select either the first output mode or the second output mode for generating compact function trace data.

23 Claims, 3 Drawing Sheets

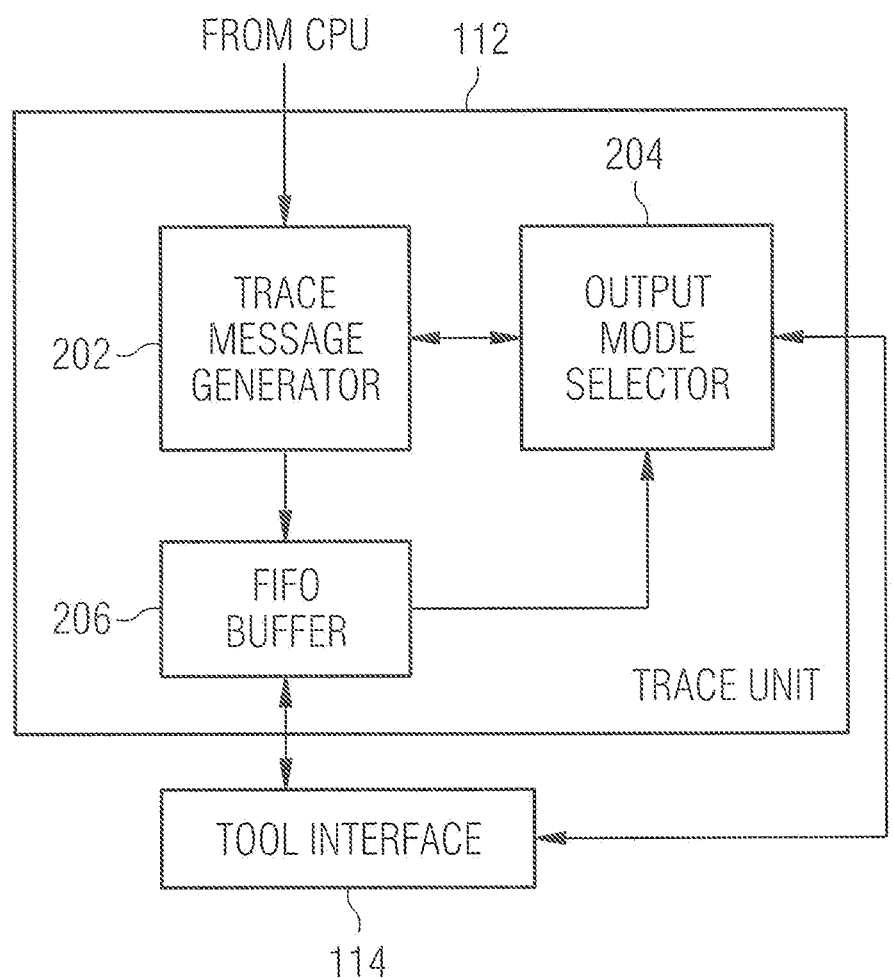

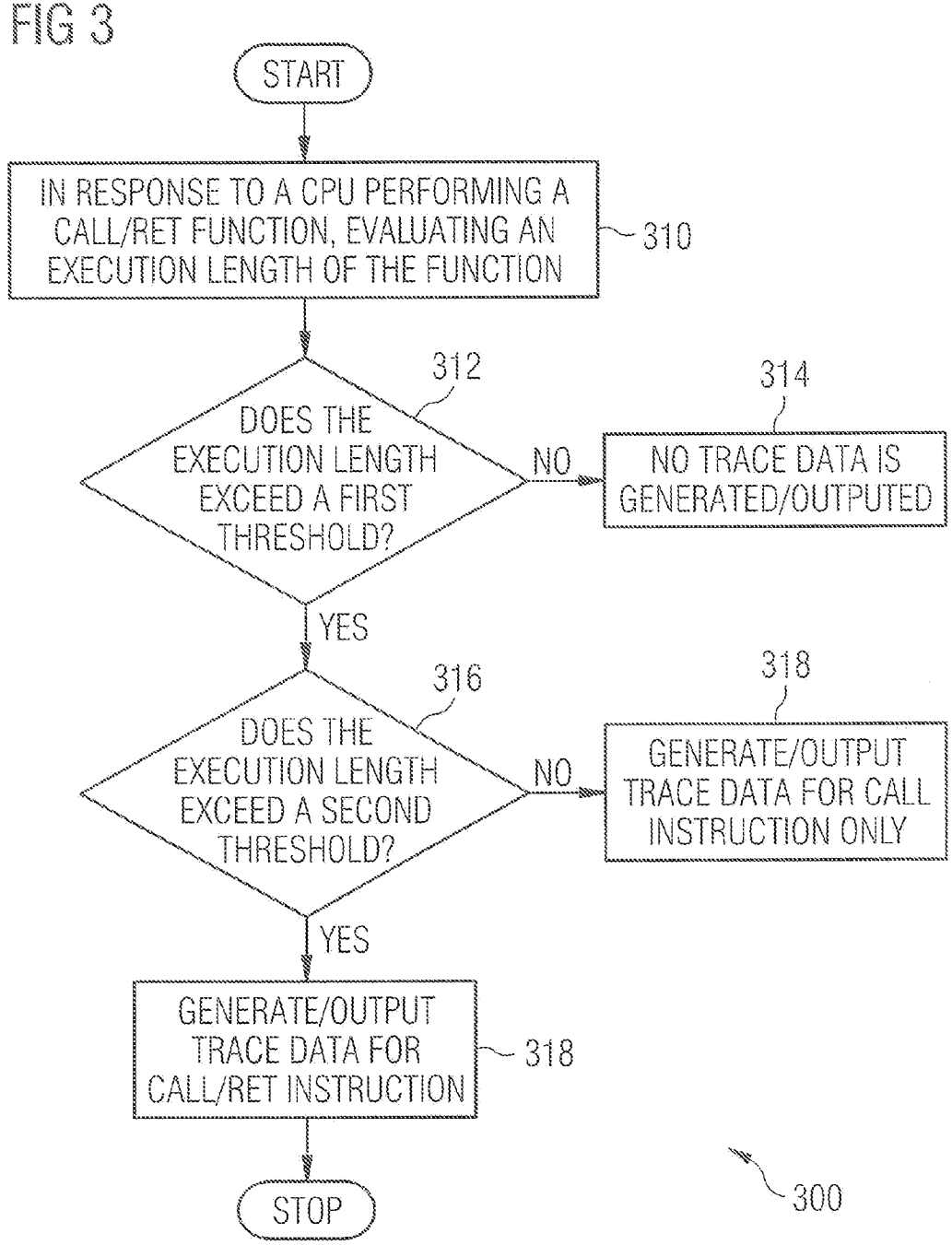

COMPACT FUNCTION TRACE BASED ON EXECUTION LENGTH OF LEAF FUNCTIONS

FIELD

The invention relates to methods and systems for creating trace solutions for debugging and performance analysis of computer processing systems. More specifically, the invention relates to methods and systems for generating compact function trace data in a computer system.

BACKGROUND

For software debugging or performance analysis, a trace flow enables the reconstruction of a monitored program flow and is therefore useful to determine which kind of events took place before a particular software problem arose. For debugging purposes, usually only a limited trace depth is needed if the trigger logic allows stopping the trace recording at or shortly after the error symptom. However, for performance analysis, long traces with high timing resolution are needed to measure the min/max/average function execution time. This analysis may be flat or nested with the full hierarchy of function calls.

Conventional trace interfaces have several disadvantages. One disadvantage is the required high bandwidth interface for the trace which typically requires at least 5 trace pins. Another disadvantage is that the time stamping is done externally. The on-chip first in first out (FIFO) buffer for trace messages can result in a certain inaccuracy of the time stamps.

Therefore, there exists a need for a system and a method for generating compact function trace data in a microprocessor for debugging and performance analysis that lowers cost and requires less bandwidth.

SUMMARY

In accordance with one aspect of the invention, a system for generating compact function trace data comprises a central processing unit (CPU), configured to output program flow information needed for generating a program flow trace, and a trace unit, coupled to the CPU, and configured to receive the program flow information from the CPU for generating compact function trace data. The trace unit may further comprise a first output mode and a second output mode and is further configured to select either the first output mode or the second output mode for generating compact function trace data.

In one embodiment, the present invention is used to generate compact function trace data for leaf functions. In this embodiment, the first output mode may be for very short leaf functions in which case no trace data is generated by the trace unit, and the second output mode may be for short leaf functions in which case trace data is only generated for a CALL instruction.

In another embodiment, the system may further comprise a trace buffer coupled to the trace unit. The trace buffer may further comprise a trace buffer fill level, and the trace unit may be further configured to select either the first output mode or the second output more for outputting compact function trace data in accordance with the trace buffer fill level.

In accordance with a further aspect of the invention, a method for generating compact function trace data for a leaf function may comprise the steps of comparing the execution length of the leaf function to at least one function execution length threshold, and generating compact function trace data for the leaf function if the execution length of the function exceeds the function execution length threshold.

One embodiment of the present invention may be for very short leaf functions in which case no trace data may be generated if the execution length of the function does not exceed the function execution length threshold. In another embodiment of the invention, the method further comprises the steps of comparing the execution length of the leaf function to a second function execution length threshold and generating compact function trace data for the leaf function if the execution length of the leaf function does not exceed the second function execution length threshold. This embodiment may be used for short leaf functions in which case only trace data for a CALL instruction may be generated if the execution length of the leaf function does not exceed the second function execution length threshold. In yet another embodiment, the method may further comprise the steps of comparing the trace buffer fill level with a trace buffer fill level threshold and generating compact function trace data for the leaf function based on whether the trace buffer fill level exceeds or does not exceed the trace buffer fill level threshold.

Further features, aspects and advantages of the present invention will become apparent from the following detailed description of the invention made with reference to the accompanying drawings.

BRIEF DESCRIPTION OF THE DRAWINGS

The accompanying drawings are included to provide a further understanding of the present invention and are incorporated in and constitute a part of this specification. The drawings illustrate embodiments of the present invention and together with the description serve to explain the principles of the invention. Other embodiments of the present invention and many of the intended advantages of the present invention will be readily appreciated as they become better understood by reference to the following detailed description.

FIG. 2 shows an exemplary schematic diagram of a trace unit according to an embodiment of the invention.

FIG. 3 shows a flowchart of exemplary method steps for generating compact function trace data according to an embodiment of the invention.

DETAILED DESCRIPTION

Figure 1:
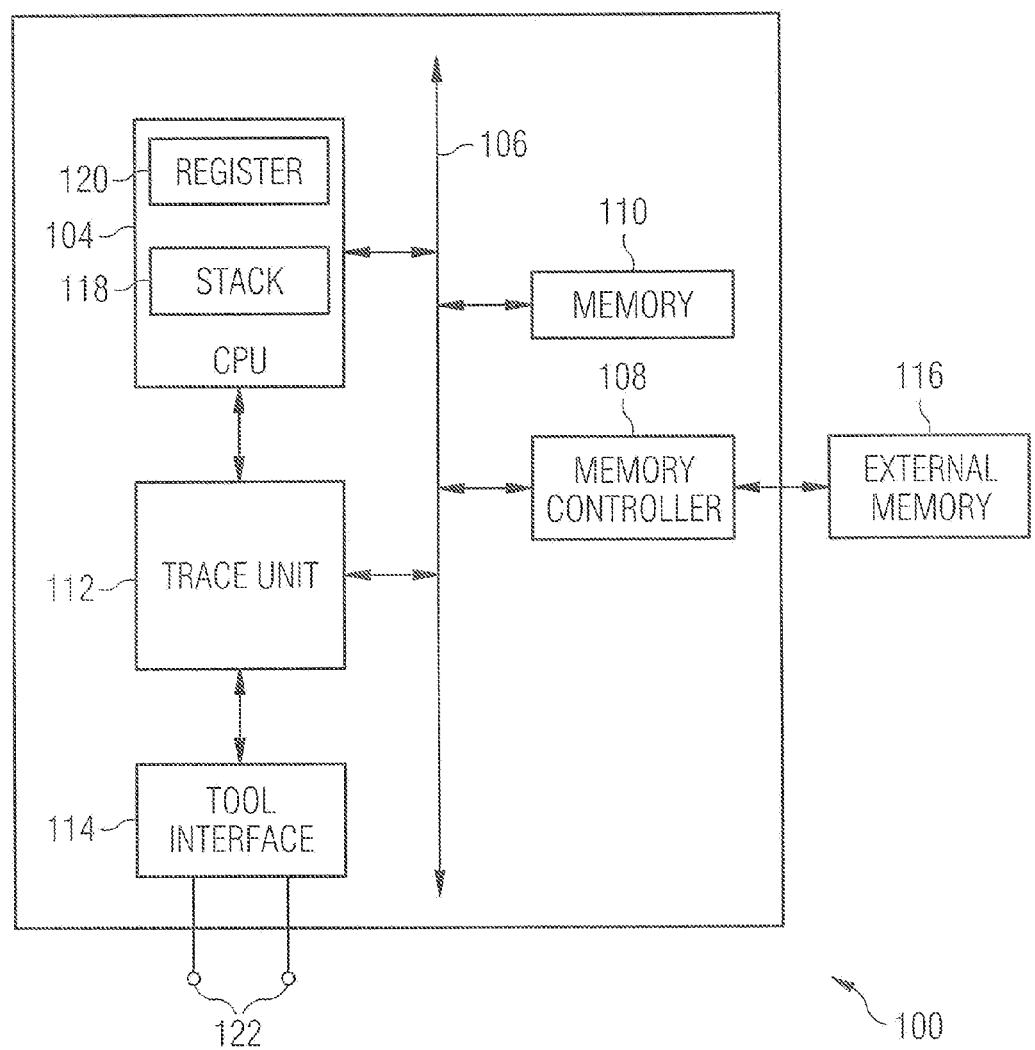
FIG. 1 shows an exemplary schematic diagram of a system according to an embodiment of the invention.

In the following detailed description, reference is made to the accompanying drawings, which form a part hereof, and in which is shown by way of illustration specific embodiments in which the invention may be practiced. It is to be understood that other embodiments may be utilized and structural or other changes may be made without departing from the scope of the present invention. Therefore, the following detailed description is not to be taken in a limiting sense, and the scope of the present invention is defined by the appended claims.

Trace flows are useful for software debugging of applications to determine which kind of events had taken place before a particular software problem arose. Trace flows are also useful to analyze performance of task-oriented embedded and non-embedded applications executed on various software/hardware platforms. For example, task oriented software programs may be executed by processors applicable to controlling aspects of industrial and consumer devices, or may include business and scientific application software. For the purposes of this description, applications, software programs, application software, program applications, and programs comprise sets of instructions executable by microprocessors, and such terms may be interchangeably used. In general, trace flows enable reconstruction of a monitored program flow.

FIG. 1 is a high-level block diagram illustrating a computer processing system 100 for generating compact function program flow trace data for leaf functions in accordance with one embodiment of the present invention. In one embodiment, the computer processing system 100 may be implemented on a microchip and includes a central processing unit (CPU) 104, a system bus 106, a memory controller 108, an internal memory 110, a trace unit 112 and a tool interface 114.

The CPU 104 is coupled to the internal memory 110 via the system bus 106 and to an external memory 116 via the system bus 106 and the memory controller 108. As illustrated, the internal memory 110 and CPU 104 may be provided on a single microchip. However, one skilled in the art will appreciate that the scope of the present invention also covers a plurality of microchips that may provide for various configurations of the components of processing system 100.

The memory 110 may comprise any combination of volatile random access memory (RAM) and non-volatile read-only memory (ROM) for storing an operating system (OS) and embedded and/or non-embedded program applications.

The CPU 104 includes one or more stacks 118 into which current program instruction addresses may be stored. The one or more stacks 118 include return address stacks (also referred to as CALL stacks) for storing return instruction addresses associated with CALL instructions to a function or subroutine of the current program being executed by the CPU. The current program instructions corresponding to the addresses may be loaded from memory 110 for execution by the CPU 104. Furthermore, the CPU 104 may include one or more instruction pointer registers 120 that contain memory addresses of instructions currently being executed by the CPU 104, or in alternative embodiments, by other microprocessors (not shown) of the computer processing system 100. In other embodiments, some or all of the stacks 118 or registers 120 may be part of the memory 110.

The external memory 116 may comprise any combination of RAM and ROM configured to store data to be used and possibly modified by the CPU 104 in execution of the program applications. The internal memory 110 may also be adapted to store data, as well as program instructions. The external memory 116 may also be provided on a microchip different than the microchip 102.

The trace unit 112 enables reconstruction of a monitored program flow via flow trace data decompression algorithms implemented by an external tool (not shown) coupled to pins 122 of the tool interface 114. For these purposes, the trace unit 112 processes trace data, i.e. information about a running application, without halting its execution and may record the trace data sequentially, i.e. information about executed instructions may be stored in the sequence of their execution. The trace unit 112 may be coupled directly to the CPU 104 for receiving the program flow information needed to generate a trace. The trace unit 112 may record values of one or more instruction pointer registers 120, also known as program counter(s), and the values of one or more stacks 118 of the CPU 104 and/or may record data accessed and processed by the CPU 104 and/or the data flow on the system bus 106 or other busses of the CPU 104 or system 100.

As illustrated, the program counter 120 is a register in the CPU 104 that indicates where the CPU 104 is in its instruction sequence in executing instructions stored in the stack 118. Depending on the type of microprocessor or CPU 104, the instruction program register 120 comprises either the address of the instruction being executed or the address of the next instruction to be executed.

When tracing the instruction pointer register 120, the trace unit 112 continually receives messages comprising program flow information, also known as trace data. In accordance with one embodiment of the present invention, the trace unit 112 receives program flow trace data for call (CALL) and return (RET) instructions and in response to a selected output mode or threshold, outputs the program flow trace data to a tool interface 114. For example, in one embodiment, the trace unit 112 may limit the output of program flow trace data for leaf functions of a particular length. In other embodiments of the present invention, the trace unit 112 may limit the output of the program flow trace data in response to the available bandwidth or an output mode selected by a user of the tool interface 114. As one skilled in the art would appreciate, the term leaf function is used to refer to functions or subroutines in a program that do not call any other functions.

FIG. 2 is a high-level block diagram of the trace unit 112 illustrated in FIG. 1 for generating compact function program flow trace data according to an embodiment of the invention. The trace unit 112 includes a trace message generator 202, an output mode selector 204, and a first-in-first-out (FIFO) buffer 206.

In operation, the trace message generator 202 generates one or more program flow trace data or messages while the CPU 104 is running a program. The output mode selector 204 evaluates one or more criteria to determine whether or not to output the program flow trace data, and if so, what data to output. After this evaluation, the output mode selector 204 determines the program flow trace data output by the trace message generator 202 to the FIFO buffer 206.

In one embodiment, the trace unit 112 of the present invention is used to generate compact program flow trace data for functions or subroutines. For example, the output mode selector 204 may determine that: 1) for very short leaf functions, no trace data will be generated, 2) for short leaf functions, only the CALL instruction will output a trace message, and 3) for the RET instruction, only the source address will be output. The determination by the output mode selector 204 may be made by evaluating the execution length of the leaf function or by evaluating the fill level of the FIFO buffer 206. In another embodiment of the present invention, a user may be able to directly manipulate the output mode selector 204 via the tool interface 114 and select the output mode or switch between the various output modes. In yet another embodiment, the output mode selector 204 may include a higher-resolution trace mode which may output program flow trace data without any omissions. Such a mode may also be determined based on the execution length of the function, based on the fill level of FIFO buffer 206 or selected directly by a user of the tool interface 114.

FIG. 3 is a flowchart showing a method 300 of generating compact function trace data according to one embodiment of the present invention. Other embodiments may perform the steps described here in different orders. Moreover, other embodiments may perform additional and/or different steps than those described here.

Initially, in response to a CPU performing a CALL/RET function, the trace unit evaluates at 310 the execution length of the CALL/RET function to determine at 312 whether it exceeds a first function execution length threshold. In one embodiment, this first function execution length threshold may be a threshold for "very short" leaf functions. An example for determining a very short leaf function threshold is described in more detail below.

In one embodiment, if the CALL/RET function does not exceed the first function execution length threshold or "very short leaf" threshold (NO at 312), then no trace data may be generated or output at 314.

If the execution length of the CALL/RET function exceeds the first function execution length threshold (YES at 312), then the trace unit may evaluate at 316 whether the execution length of the CALL/RET function exceeds a second function execution length threshold. In one embodiment, this second function execution length threshold may be used to identify a "short" leaf function. An example for determining a short leaf function threshold is described in more detail below.

In one embodiment, if the CALL/RET function does not exceed the second function execution length threshold or "short leaf" function threshold (NO at 316), then the trace unit may operate in an "only CALL trace" mode and generate at 318 compact function trace data only for the CALL instruction.

If the execution length of the CALL/RET function exceeds the second function execution length threshold or short leaf function threshold (YES at 316), then the trace unit may generate at 318 trace data for the CALL/RET instruction. In one embodiment, the trace unit outputs for each CALL function the source address plus a time stamp and for each RET instruction the source address, the target address and a time stamp, which typically amounts to about 150 bits. The inclusion of a time stamp in the output is optional.

Thus, the present invention advantageously lowers bandwidth and decreases cost by limiting or eliminating the trace data generated or output depending on a chosen threshold. Although the execution length of a leaf function has been used to determine which compact function trace data to generate or output, one skilled in the art will realize that the selection, limitation or elimination of trace data to be generated or output may be based upon other factors, such as the fill level of a buffer or upon selection by a user.

The function execution length thresholds of the present invention are configurable and may vary according to other performance specifications. Additionally, there may be only one function execution length threshold or several. For example, a statistical analysis of various application traces, such as those used for various automotive power-train application traces, may indicate on average a function call every 60 CPU clock cycles in which 80% of the function calls were to leaf functions. Of these calls to leaf functions, 22% of all function calls may have taken 8 or fewer cycles, 39% may have taken 16 or fewer cycles, and 15% may call the same function again as before. Thus, in one embodiment, the function execution length threshold for omitted functions or "very short leaf" functions may be 16 cycles, and the function execution length threshold for "only CALL trace" or "short leaf" functions may be 100 cycles. By limiting the output of the program flow trace data for leaf functions which do not exceed certain thresholds, the present invention advantageously decreases the amount of bandwidth required for outputting the function trace data. In this example, only 45 bits of trace data would be generated for a given function. Thus, for a 300 MHz CPU about 28 Mbytes/sec of trace data would be generated which would be less than the available bandwidth of a 3 pin DAP Debug Tool I/F.

For a RET instruction, a similar procedure may be used to determine the function execution length threshold, however the message can be immediately output. In this case, the length of the executed function is known at this point of time, so the decision whether to output a full trace message, a reduced trace message, or no trace message can be made and executed immediately. A full trace message contains the source address, the target address and a time stamp. A compact or reduced trace message contains just the source address with an optional time stamp.

In another embodiment of the present invention, the trace unit may also evaluate the fill level of the trace buffer to determine whether to generate or output compact function trace data. A trace unit in accordance with the present invention may limit the generation or output of trace data for a function depending on whether the trace buffer fill level exceeds or does not exceed a specified trace buffer level threshold.

For example, in one embodiment of the present invention, in response to a CPU performing a CALL/RET function, the trace unit may evaluate the trace buffer fill level and a trace buffer level threshold. If the trace buffer fill level exceeds a first trace buffer level threshold, then no trace data may be generated or output by the trace unit. The trace unit may then evaluate the trace buffer fill level against a lower second trace buffer level threshold. If the trace buffer fill level exceeds the second trace buffer level threshold, then the trace data generated or output may be limited. In one embodiment, the trace unit may then operate in an "only CALL trace" mode and generate trace data only for the CALL instruction.

If the execution length of the CALL/RET function does not exceed either the first or the second buffer level threshold, then the trace unit may generate trace data for the CALL/RET instruction. In one embodiment, the trace unit may output for each CALL function the source address plus an optional time stamp and for each RET instruction the source address, the target address and an optional time stamp, all of which typically amount to about 150 bits.

The trace buffer fill level threshold of the present invention is configurable and may vary according to other performance specifications. Additionally, there may be only one trace buffer fill level threshold or several.

In yet another embodiment of the present invention, the trace buffer fill level may be used to determine or configure the threshold for short leaf functions and/or very short leaf functions. In such an embodiment, the present invention may compare the trace buffer fill level with a trace buffer fill level threshold and then adapt the threshold for the short leaf functions and/or very short leaf functions, such as the function execution length threshold, depending on the trace buffer fill level.

In another embodiment of the present invention, the program flow trace data generated by a CALL function may be stored locally in a memory unit with a time stamp until the threshold in cycles for "omitted functions" has elapsed or are no longer valid, after which the trace data is output. To avoid violating a strict temporal order of trace data from various sources in a trace buffer or to align data trace and program trace, the program trace mode may be changed temporarily by a second trace source. For instance, this second trace source can be another CPU on the same chip. A function, as part of the software running on the second CPU interacts with the software on the first CPU. Thus, the trace mode on the first CPU is changed to a higher resolution mode while this specific function on the second CPU is running.

In another embodiment of the present invention, thresholds may also be used to select the output mode for interrupts. For example, the trace data for interrupts may be either suppressed completely or handled as standard function calls without a CALL instruction. Additionally, in yet another embodiment, the current task ID may be traced as well. This may be done with a data trace of the task ID variable which then allows a hierarchical analysis of the function calls for the different tasks.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A system for generating compact function trace data, comprising:
   a central processing unit (CPU) configured to output program flow information needed for generating a program flow trace; and
   a trace unit coupled to the CPU and configured to receive the program flow information from the CPU for generating compact function trace data, the trace unit comprising at least a first output mode and a second output mode, and further configured to select either the first output mode or the second output mode for generating the compact function trace data, wherein the first output mode is selected for very short leaf functions in which case no trace data is generated by the trace unit.

2. The system of claim 1, wherein the compact function trace data is generated for leaf functions.

3. The system of claim 1, wherein the second output mode is selected for short leaf functions, and wherein in the second output mode the compact function trace data is generated by the trace unit only for a CALL instruction.

4. The system of claim 1, further comprising a trace buffer coupled to the trace unit, the trace buffer comprising a trace buffer fill level, and wherein the trace unit is further configured to select either the first output mode or the second output mode for outputting the compact function trace data in accordance with the trace buffer fill level.

5. The system of claim 1, further comprising a trace buffer coupled to the trace unit, the trace buffer comprising a trace buffer fill level, and wherein the trace unit is further configured to change a threshold for short leaf functions or for very short leaf functions, or for both, in accordance with the trace buffer fill level.

6. The system of claim 1, wherein the compact function trace data includes a time stamp.

7. A method comprising:
   comparing, via a trace unit coupled to a processor, an execution length of a leaf function to a first function execution length threshold; and
   generating trace data for the leaf function in response to the execution length of the leaf function exceeding the first function execution length threshold.

8. The method of claim 7, wherein the trace data is not generated in response to the execution length of the leaf function not exceeding the first function execution length threshold.

9. The method of claim 7, further comprising:
   comparing the execution length of the leaf function to a second function execution length threshold; and
   generating compact function trace data for the leaf function in response to the execution length of the leaf function not exceeding the second function execution length threshold,
   wherein the first and second function execution length thresholds are different.

10. The method of claim 9, wherein only the trace data for a CALL instruction is generated in response to the execution length of the leaf function not exceeding the second function execution length threshold.

11. The method of claim 7, further comprising:
    evaluating a fill level of a trace buffer;
    comparing the fill level of the trace buffer with a trace buffer fill level threshold; and
    generating trace data for the leaf function in response to the fill level of the trace buffer not exceeding the trace buffer fill level threshold.

12. The method of claim 7, further comprising:
    evaluating a fill level of a trace buffer;
    comparing the fill level of the trace buffer with a trace buffer fill level threshold; and
    adapting the trace buffer fill level threshold for short leaf functions or very short leaf functions, or both, depending on the fill level of the trace buffer.

13. A system for generating compact function trace data, comprising:
    a trace message generator configured to generate the compact function trace data for a leaf function; and
    an output mode selector, coupled to the trace message generator, configured to evaluate an execution length of the leaf function and determine the compact function trace data to be generated by the trace message generator based on the execution length of the leaf function.

14. The system of claim 13, wherein the output mode selector is further configured to evaluate the execution length of the leaf function and a function execution length threshold to generate the compact function trace data.

15. The system of claim 14, wherein the function execution length threshold comprises a very short leaf function threshold and wherein the output mode selector is further configured to compare the execution length of the leaf function with the very short leaf function threshold and a short leaf function threshold.

16. The system of claim 15, wherein no program flow trace data is output for a very short leaf function.

17. The system of claim 15, wherein program flow trace data is generated only for a CALL instruction for a short leaf function.

18. The system of claim 13, wherein the trace unit is configured to output a source address for a RET instruction for the leaf function.

19. The system of claim 13, further comprising a buffer coupled to the trace message generator, the buffer comprising a buffer fill level, wherein the output mode selector is configured to generate compact function trace data in accordance with the trace buffer fill level.

20. A system for generating program flow trace data for leaf functions, comprising:
    a central processing unit (CPU) comprising a stack configured to store instruction addresses of a program, the CPU configured to generate the program flow trace data for the leaf functions; and
    a trace unit coupled to the CPU, the trace unit configured to output the program flow trace data for the leaf functions in accordance with an output mode;
    a trace unit mode selector coupled to the trace unit, the trace unit mode selector comprising at least a first output mode and a second output mode and configured to select either the first output mode or the second output mode as the output mode for outputting the program flow trace data; and
    a trace buffer comprising a trace buffer fill level, coupled to the trace unit, wherein a threshold for short leaf functions or very short leaf functions, or both, is changed in accordance with a trace buffer fill level of the trace buffer.

21. The system of claim 20, further comprising a trace buffer coupled to the trace unit wherein the trace unit mode selector is configured to select either the first output mode or the second output mode for outputting the program flow trace data in accordance with a trace buffer fill level.

22. A system for generating compact function trace data for a leaf function, comprising:
   a central processing unit (CPU) configured to transfer program flow information needed for generating a program flow trace; and
   a trace unit coupled to the CPU and configured to receive the program flow information from the CPU for generating compact function trace data, the trace unit comprising at least a first output mode and a second output mode, and further configured to select either the first output mode or the second output mode for generating the compact function trace data,
   wherein the first output mode is for very short leaf functions in which case no trace data is generated by the trace unit, and
   wherein the second output mode is for short leaf functions in which case the compact function trace data is generated only for a CALL instruction.

23. The system of claim 22, further comprising a trace buffer coupled to the trace unit, the trace buffer comprising a trace buffer fill level, wherein the trace unit is further configured to select either the first output mode or the second output mode for outputting the compact function trace data in accordance with the trace buffer fill level.

* * * * *